United States Patent [19]

Fang

[11] Patent Number: 5,363,267
[45] Date of Patent: Nov. 8, 1994

[54] HEAD TIP CLEANING TAPE AND ITS CLEANING METHOD

[76] Inventor: C. Y. Fang, No. 67, Ren Ay Road, Hsing Chu City, Taiwan, Prov. of China

[21] Appl. No.: 988,319

[22] Filed: Dec. 9, 1992

[51] Int. Cl.$^5$ ............................................. G11B 5/41
[52] U.S. Cl. ............................. 360/128; 15/DIG. 12
[58] Field of Search ............... 360/128, 137; 15/210.1, 15/DIG. 12

[56] References Cited

U.S. PATENT DOCUMENTS

| | | | |
|---|---|---|---|
| 3,069,815 | 12/1962 | Valentine | 15/DIG. 12 |
| 4,652,958 | 3/1987 | Miyoshi et al. | 360/128 |
| 4,661,874 | 4/1987 | Buehl et al. | 360/128 |
| 4,864,351 | 9/1989 | Imai et al. | 15/DIG. 12 |
| 4,928,189 | 5/1990 | Siddiq | 360/128 |
| 5,012,377 | 4/1991 | Siddio et al. | 360/128 |
| 5,173,827 | 12/1992 | Boshek, Jr. | 360/128 |

FOREIGN PATENT DOCUMENTS 61-192017  8/1986  Japan ............................... 360/128

*Primary Examiner*—A. J. Heinz
*Assistant Examiner*—Jefferson Evans
*Attorney, Agent, or Firm*—Morton J. Rosenberg; David I. Klein

[57] ABSTRACT

A cleaning tape structure is provided for removing dust from a magnetic head tip, The dust on the head tip is collected by the membranes installed on the tape surface. A laser beam is used to make vertical cuts on the tape surface in several oblique arrays of grooves. The dust is removed by the cutting edges formed by the peripheral edges of the grooves and then collected by the membranes installed at the end of each of four tape sections. The four sections also function to indicate the remaining life of the head tip, based on the number of sections which must pass the head tip before a picture prerecorded on the cleaning tape can be clearly viewed.

2 Claims, 3 Drawing Sheets

HEAD TIP CLEANING TAPE AND ITS CLEANING METHOD

BACKGROUND OF THE INVENTION

The fact that a VCR is able to re-generate pictures and sound is due to the contact of the head tip and video tape. The head tip picks up magnetic signals and converts them into pictures and sound. After the VCR has been used for some time, the head tip will be covered with some magnetic powder or fungi. This will reduce the capability of the head tip to steadily pick up the magnetic signals. Hence, the purpose of a head tip cleaning tape is to remove the dust from a VCR head tip in order to maintain stable picture and sound effects.

Based on past experiences, conventional cleaning tapes usually worked well the first several times. It then gradually lost its cleaning capability. In some cases, the cleaning tape even damaged the head tip. The Applicant had been engaging in the research of the magnetic head and had found that the structural design was the reason for the cleaning tape being short lived. The conventional cleaning tape has several convexed magnetic particles sparsely located on the top of the 35 μm thick tape surface. The contact friction between the magnetic particles and head tip enables the dust to be removed from the head tip. The removed dust then fills in the spaces between magnetic particles and gradually causes them to lose the dust-removing capability which results in poor cleaning effect and shortened life for the head tip.

Hence, the Applicant is proposing a whole new design of head tip cleaning and associated tape structure. The principle is to cut several oblique arrays of grooves on the video tape surface with a laser beam. 90° vertical cutting edges are then formed on the two sides of the grooves with the remaining powder particles. The accumulated dust can be removed from the cutting edges and collected by membranes installed on the tape. The design which used the dust-removing cutting edge structure and the dust-collecting membranes renders complete cleaning and repeatability of usage.

Also, this invention employs the conventional fine video tape surface instead of the rough surface with convexed magnetic particles. Damages on the head tip can thus be avoided.

In addition, this invention provides a function of indicating the head tip wear during the cleaning process. Consumers will be able to monitor the remaining life of the head tip through this function.

SUMMARY OF THE INVENTION

This invention provides a whole new design for a head tip cleaning tape and the cleaning method. The principle is to cut vertically several oblique arrays of grooves on the video tape surface with a laser beam. 90° vertical cutting edges are then formed on the two sides of the grooves with the remaining magnetic powder particles. The accumulated dust can be removed from the cutting edges and the installed membranes can be used to collect the dust. The invention hence provides a design for complete cleaning and repeatable use. In addition, a function for indicating the head tip wear is implemented in the process of cleaning. With this predictive design, the users will be able to monitor the remaining life of the head tip.

BRIEF DESCRIPTION OF THE DRAWINGS

The technical structure and operation to achieve the above purposes are described in detail with the accompanying Figures.

DETAILED DESCRIPTION OF THE PREFERRED EMBODIMENT

Figure 1:
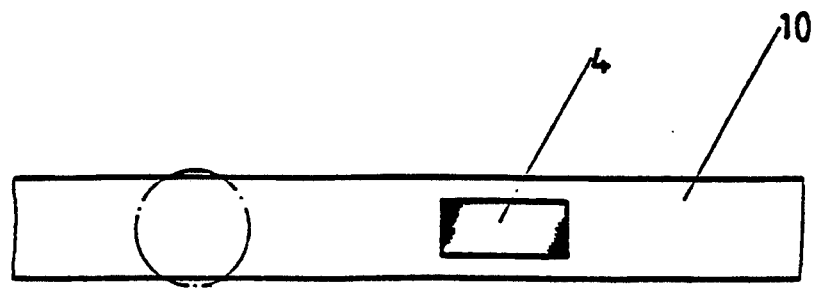
FIG. 1 is a plan view of a portion of the cleaning tape of the present invention.
Figure 1A:
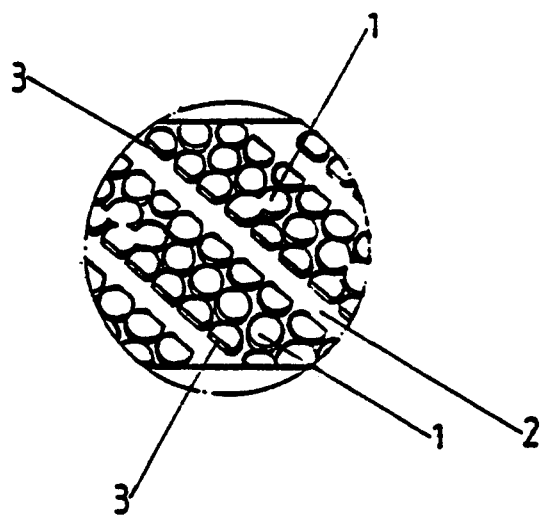
FIG. 1A is an enlarged view of the cleaning tape surface of the present invention.
Figure 2:
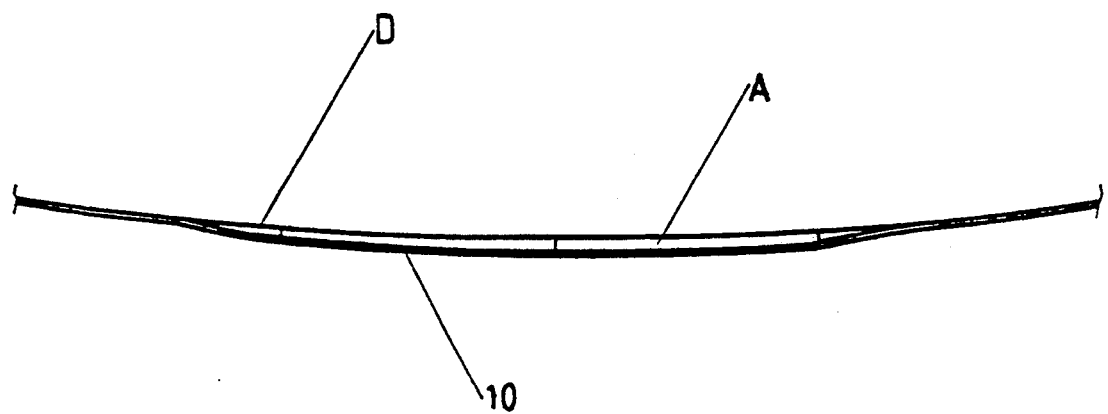
FIG. 2 is an enlarged schematic representation of the cleaning tape of the present invention going past a head tip.
Figure 3:
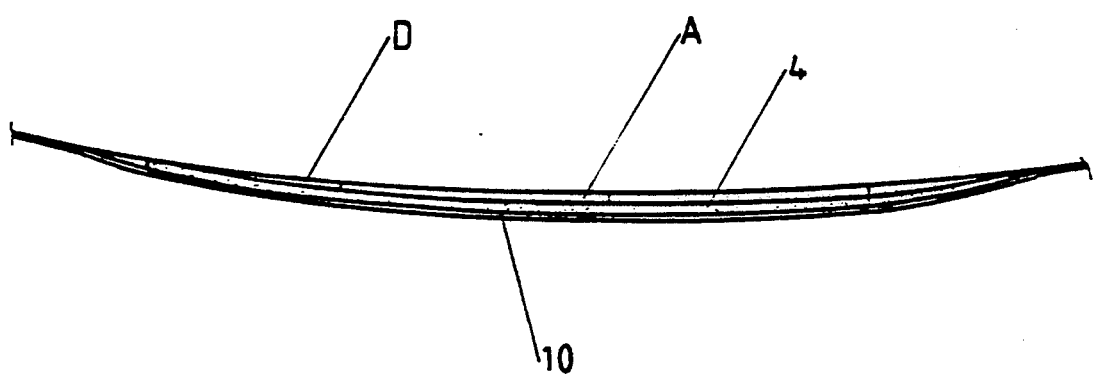
FIG. 3 is an enlarged schematic representation of the membrane of the present invention going past a head tip; and, FIG. 4 is a perspective view of a conventional head tip.

Referring to FIGS. 1 and 1A, the cleaning tape 1 of this invention is manufactured using a laser beam to vertically remove magnetic powder particles from the video tape surface to form several oblique arrays of grooves 2. The adjacent surfaces of the grooves and remaining powder particles define cutting edges. The concept is therefore to use the design of the cutting edges to remove dust from the head tip. When the cleaning tape 10 continuously goes past the head tip A via the magnetic drum motor, as shown in FIG. 2, the cutting edges 3 formed on the tape surface will continuously remove the accumulated dust from the head Lip A. In general, only 5–10 seconds are required for the removal. To avoid the removed dust being scattered or attached back to the head tip A, the dust will be collected by membranes 4 affixed to the tape, as shown in FIG. 3.

The membranes are provided for collecting dust. They are formed by fibers having a soft surface and elasticity. After being processed, a non-oil base high density polymeric .Lubricant is applied with high pressure to the membranes. This is to provide the lubricating effect and prevent the collected dust from being scattering around. The membranes 4 with glue disposed on she back surface thereof are located at appropriate intervals on the tape surface and affixed thereto, as shown in FIG. 1.

Figure 4:
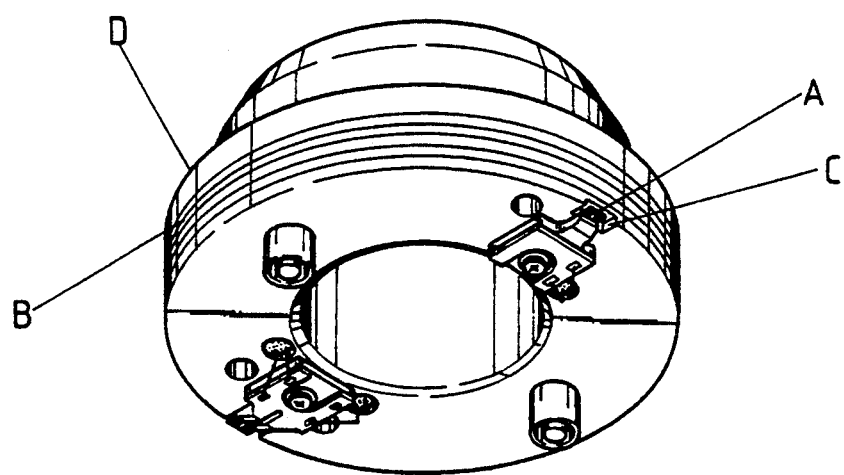

The membranes 4 are elastic, as mentioned previously. With the help of centrifugal force, they will remove and collect the dust scattered on the magnetic drum D, siphon groove B and even the head tip installation groove C. The action of elasticity is depicted in FIGS. 2 and 3, schematically representing the operation, with reference to FIG. 4, illustrating an exterior view of the head tip. Generally, the head tip A extends 30–50 μm from the drum surface, this differential in distance causes a vibration to be generated when the cleaning tape turns to where one of the membranes 4 is right in front of the head tip A. The vibration will shake the elastic membrane 4 to prevent the dust from staying in the magnetic drum siphon groove, head tip installation groove and even the tape surface grooves. Moreover, the membranes 4 will collect the dust with the assistance of the vibration and centrifugal forces. The head tip is therefore very clean and will maintain the clearness of the pictures produced from the signals recorded on video tapes.

The cleaning tape 10 of this invention is divided into 4 sections. The previously mentioned membranes 4 are adhered to the tape at the end of each section. Several images are pre-recorded on the tape surface to indicate the cleanliness of the head tip A. When the "PLAY" key is pressed, the cleaning tape 10 starts the cleaning operation. If the monitor displays a clear picture then the head tip A is clean, otherwise it is not. Despite the cleanliness of the head tip, an indicating white line will appear on the picture every time the head tip turns to the membrane at the end of each section. The cleaning process is thereby completed and the user can press "STOP" to terminate the operation of the cleaning tape.

The head tip A will wear out from use, over time. As previously mentioned, the head tip A extends out from the magnetic drum by 30-50 μm depending on the model of recorder, a BETA tape machine head tip extends 50 μm, for example. The head tip A will have a better contact with the video tape and an optimum signal pick-up if the head tip A does not wear out. When the extension of the head tip gradually wears out, the contact between the tape and head tip A becomes looser and the capability of signal pick-up reduces. The head tip A needs to be replaced if the head tip A extension wears down to the extent that the signal can no longer be picked-up. It should be noted that the contact force between the head tip A and tape surface depends on the amount the head tip A extends out from the magnetic drum D. The contact force is also related to the dust-removing effect of the tape surface. That is, the more the extension the larger the contact force and the better the removing effect will be, it is this principle which is employed in the inventive concept to provide a head tip wear out indication in the process of tape cleaning. As mentioned previously, the cleaning tape 10 is divided into four sections. There is a membrane 4 located at the end of each section and an indication of such is seen by a white line on the video picture. A testing of the surface contact force indicates that when the head tip A wears by 20%, it can be reused for another 500 hours and will be cleaned by the end of the first section. When the head tip A is not cleaned until the end of the second section, the wear out is 50% and can be reused for another 400 hours. When the head tip wears by 70%, it can only be used for another 250 hours and is not cleaned until the end of the third section is reached. If a clear picture appears only at the end of the fourth section, the head tip A is already worn by 80% and can only be used for another 100 hours. Also, if the clear picture does not appear when the cleaning tape 10 has reached the end of the fourth section, the tape should be rewound to the beginning and the process of cleaning repeated for 5-8 times. However, at this time the head tip A is already worn by over 90% and may be totally worn out at any time. In other words, the user will be able to monitor the head tip wear out situation, and thereby its remaining life based on which section the tape is at the head tip when the clear picture appears. This function is an innovative design and offers convenience to the users.

I claim:

1. A magnetic head cleaning tape, comprising:
   a longitudinally extended tape substrate having four consecutive cleaning sections defined thereon, each of said four cleaning sections of said tape substrate having a magnetic material coating thereon and a multiplicity of spaced parallel laser cut grooves formed in said coating to define cutting edges at peripheral edges of said grooves, each of said multiplicity of grooves extending obliquely with respect to said longitudinal direction;
   four elastic membrane members affixed to said tape substrate in longitudinally spaced relation, each of said four membrane members being positioned on said tape substrate at a terminus of a respective one of said four cleaning sections; and,
   a non-oil base high density polymeric lubricant impregnated within each of said four membrane members.

2. The magnetic head cleaning tape as recited in claim 1 where said coated tape substrate has been prerecorded with a video image signal, said video image signal being respectively interrupted by each of said four membrane members to thereby identify the passage of each of said four consecutive cleaning sections with respect to the magnetic head being cleaned, whereby an amount of wear of a magnetic head is indicated by which of said four consecutive cleaning sections has passed the magnetic head before a clear video image is observed.

* * * * *